United States Patent [19]

Krueger

[11] 4,259,638
[45] Mar. 31, 1981

[54] APPARATUS FOR INDUCING NUCLEAR MAGNETIC RESONANCE WITHIN FLOWING MEDIUMS INCLUDING SUPERCONDUCTING COILS

[75] Inventor: Gottfried J. Krueger, Reno die Leggiuno, Italy

[73] Assignee: European Atomic Energy Community (EURATOM), Luxembourg

[21] Appl. No.: 949,095

[22] Filed: Oct. 6, 1978

[30] Foreign Application Priority Data

Oct. 6, 1977 [DE] Fed. Rep. of Germany ....... 2745039

[51] Int. Cl.³ ............................................ G01N 27/00
[52] U.S. Cl. .................................... 324/306; 324/318
[58] Field of Search .......... 324/0.5 R, 0.5 B, 0.5 MA, 324/0.5 H, 306

[56] References Cited

U.S. PATENT DOCUMENTS

| 3,419,793 | 12/1968 | Genthe et al. | 324/0.5 B |
| 3,559,044 | 1/1971 | Heyden | 324/0.5 B |
| 4,152,638 | 5/1979 | Kruger | 324/0.5 B |

*Primary Examiner*—Michael J. Tokar

*Attorney, Agent, or Firm*—Stevens, Davis, Miller & Mosher

[57] ABSTRACT

Apparatus including a superconducting magnetic assembly for inducing nuclear magnetic resonance within a flowing medium. In order to make nuclear magnetic resonance measurements on a flowing medium it is preferred to have separate polarizing and resonating fields situated consecutively along the flow path, with the magnetic flux density in the resonating region being reduced from that in the previous polarizing region.

The signal to noise ratio in such a system is improved by increasing the magnetic flux density in the polarizing region as much as possible. Using superconducting coils to provide the magnetic fields a lighter assembly with increased polarizing field strength over that of an equivalent iron-cored electromagnet is obtained. The geometry of the coil windings establishes the field differences, the lower field region being in consequence of any combination of an increased coil spacing, greater coil width or reduced number of turns on the portion of windings corresponding to the resonating field region. Homogeneity of the field regions is enhanced by the ends of each set of windings being upturned.

3 Claims, 17 Drawing Figures

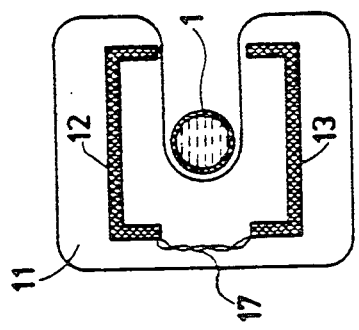
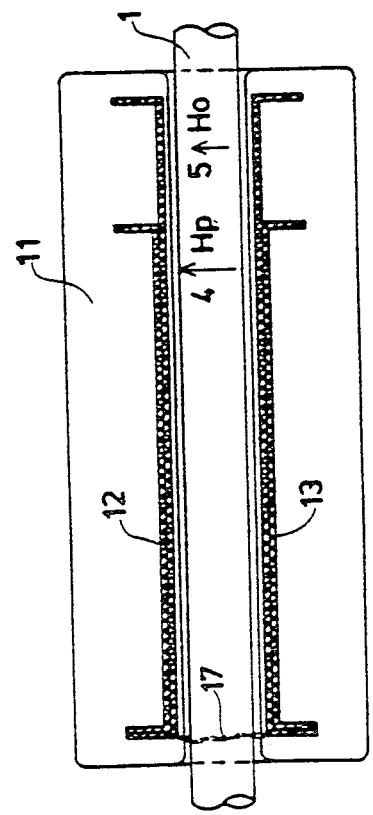
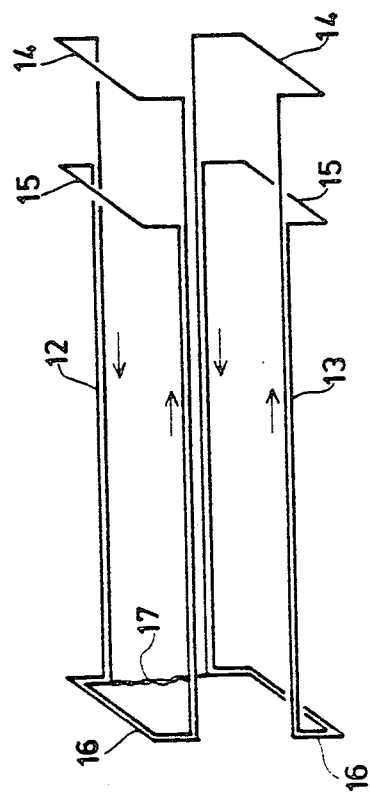

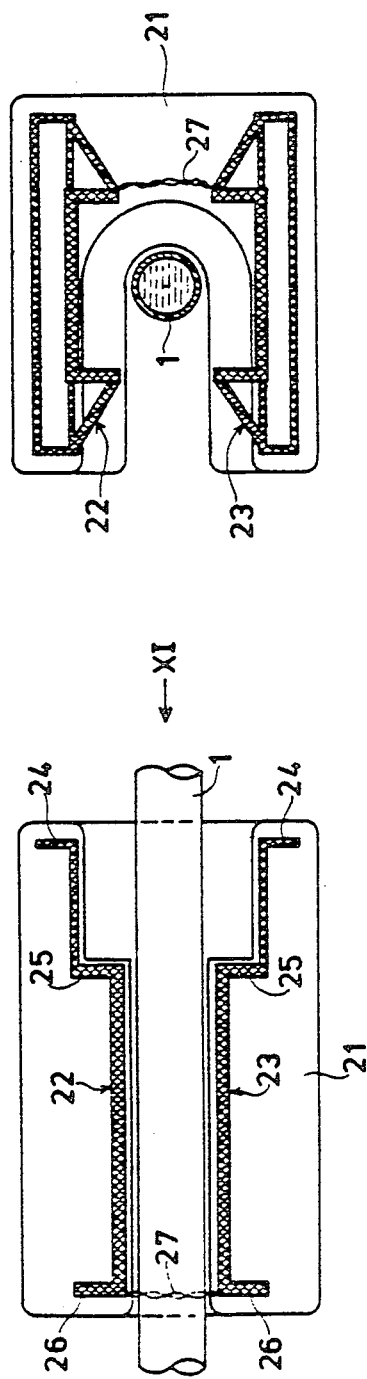

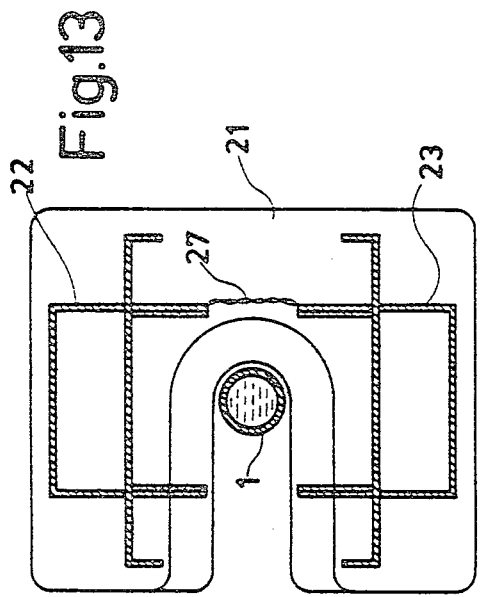
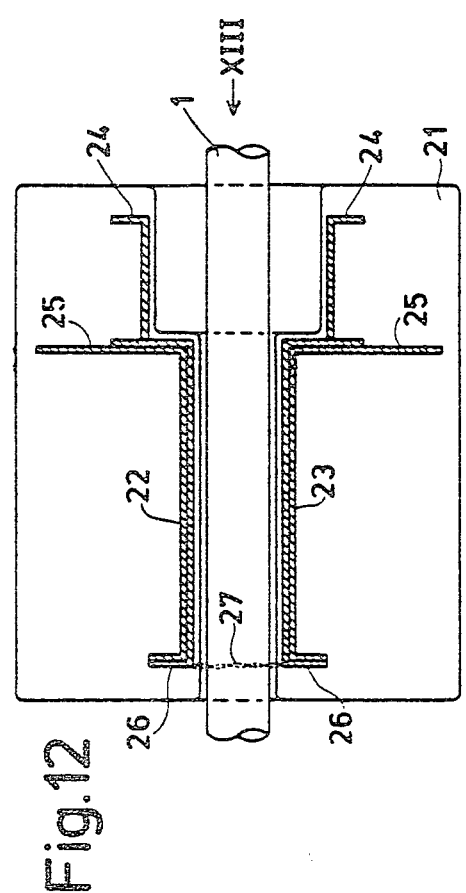
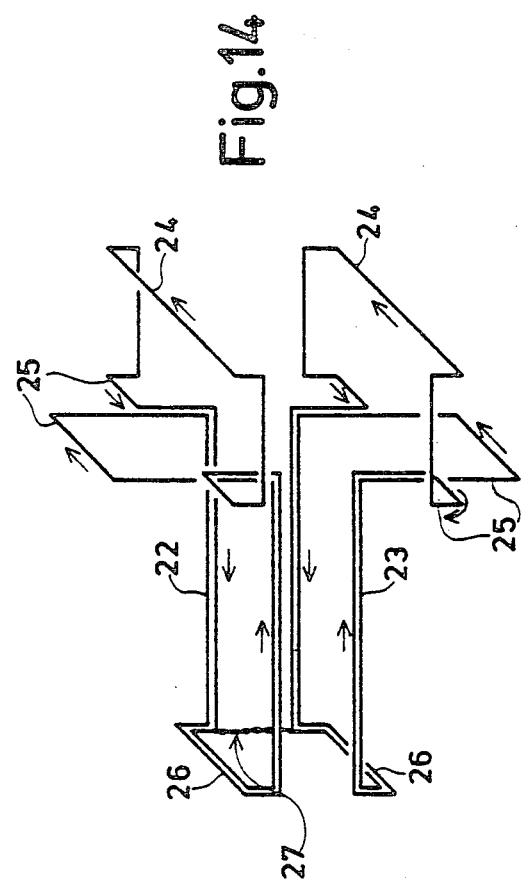

APPARATUS FOR INDUCING NUCLEAR MAGNETIC RESONANCE WITHIN FLOWING MEDIUMS INCLUDING SUPERCONDUCTING COILS

BACKGROUND OF THE INVENTION

This invention relates to apparatus for inducing nuclear magnetic resonance in a flowing medium.

Nuclear spin resonance, more commonly known as nuclear magnetic resonance (NMR), measurements of flowing mediums have been used to establish flow velocity, or mass throughput, and there is particular interest in the application of such a method to the instance of unsteady high-speed two-phase flow in wide tubes, such as occurs for example in the circulatory cooling systems of nuclear reactors. An NMR signal is obtained by examining the radio frequency spectrum of a sample in a strong magnetic field. The magnetic field causes nuclear spin splitting, the "resonance" being the resulting transition frequency between the split energy levels. Previously, systems have been proposed in which separate magnets have been used for the production of polarising and measuring fields, and a modified system in which a single magnet is used for the two fields. Two major considerations in designing apparatus of this type are establishing the best possible signal to noise ratio, and simultaneously keeping the assembly compact and the weight to a minimum.

SUMMARY OF THE INVENTION

Accordingly in the present invention a superconducting magnet is used to create a polarising field and a different resonating field.

In one embodiment according to the invention apparatus for inducing nuclear magnetic resonance within a flowing medium contained within a conduit comprises a magnetic assembly including a pair of superconducting coils, the faces of which extend along opposite sides of a length of the conduit, a first region of the coils being constructed to produce a relatively greater magnetic flux density across a first section of said length of conduit, and a second region of the coils being constructed to produce a relatively lesser magnetic flux density across a second section of said length of conduit.

The second section of the length of conduit is preferably shorter than the first section. Reduction of the magnetic flux density in the second region of the coils may be achieved by increasing the separation thereof, preferably stepwise, or by increasing the width of the coil in that region, or both. A further preferred way of effecting the reduced field is by having a reduced number of the turns of the coil windings extending over the second region.

Using a superconducting magnetic assembly of this type, greater magnetic flux density may be achieved than with iron pole-piece electromagnets, which in turn may enable either an improvement in signal to noise ratio in the mass throughput measurement, or for the same signal to noise ratio enable a shorter overall length of the magnet. In general such a superconducting magnetic assembly may be 1/10 to 1/17 the weight of a corresponding iron cored electromagnet.

DESCRIPTION OF THE ACCOMPANYING DRAWINGS

Reference is made in the following description to the accompanying drawings in which:

FIG. 4 shows a side view of another embodiment of an apparatus according to the invention;

FIG. 5 shows an end view of the embodiment of FIG. 4;

FIG. 6 shows a diagrammatic illustration in perspective of the windings of the apparatus according to FIGS. 4 and 5;

FIG. 10 shows a side view of another embodiment of the apparatus according to FIG. 7;

FIG. 11 shows an end view of the apparatus according to FIG. 10 in the direction of the arrow XI in FIG. 10;

FIG. 12 shows a side view of another embodiment of the apparatus according to the invention;

FIG. 13 shows an end view of the apparatus according to FIG. 12 in the direction of the arrow XIII in FIG. 12;

FIG. 14 shows a diagrammatic illustration in perspective of the windings of the apparatus according to FIGS. 12 and 13;

Figure 2:
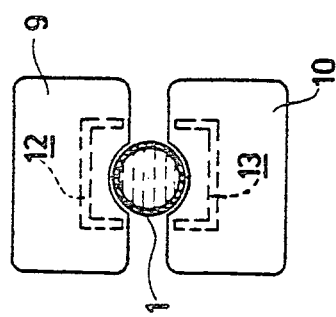
FIG. 2 shows an end view of the apparatus of FIG. 1.

In the diagrammatic illustrations of the windings, the direction of the current is indicated in each case by arrows.

DESCRIPTION OF THE PREFERRED EMBODIMENTS

The apparatus shown in the drawings is suitable, though not exclusively, for measurement of mass throughput of a fluid in a tube which comprises the circulatory cooling system of a nuclear reactor.

Figure 1:
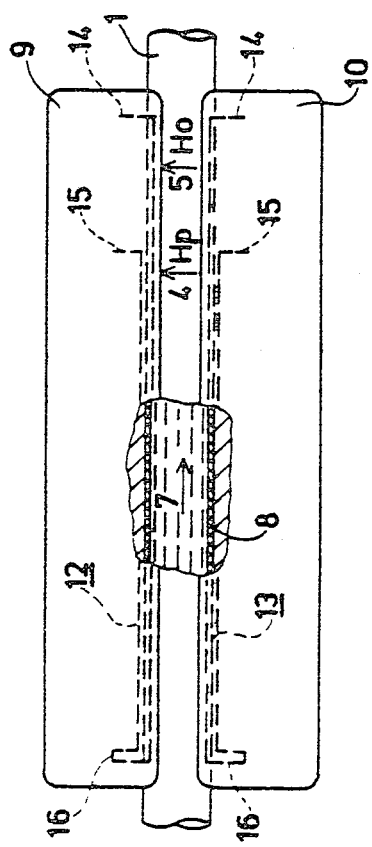
FIG. 1 shows a side view of an apparatus according to the invention.

Referring to FIG. 1, two separate superconducting coils or windings 12 and 13, which are each situated within an individual cryostat 9 and 10 respectively, constitute a superconducting magnet assembly which is arranged symmetrically around a circulation tube 1. The arrow 7 indicates the flow direction of a quantity of fluid 8 in the circulation tube 1. The superconducting magnet, or cryomagnet, assembly produces a polarisation field 4 with a magnetic field strength $H_p$ extending in the direction indicated, perpendicular to the flow direction 7, and also produces a resonance or measuring field 5 at a later point with respect to fluid flow 7, with a magnetic field strength $H_o$, also extending, as indicated, perpendicular to the flow direction 7. The windings 12 and 13 each have a protracted winding head 14, a retracted winding head 15 and a common winding head 16. FIG. 2 shows an end view of the embodiment illustrated in FIG. 1.

Figure 3:
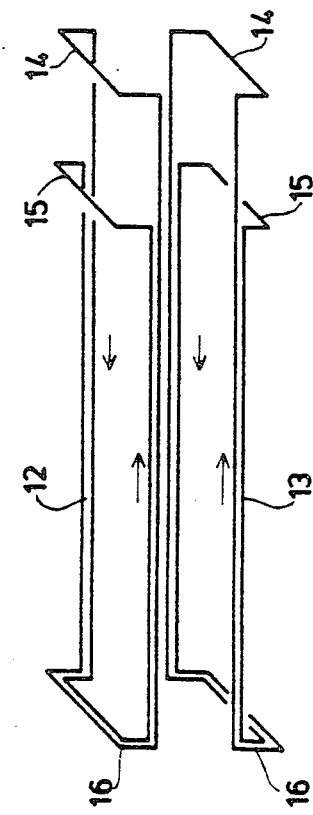
FIG. 3 shows a diagrammatic illustration in perspective of the windings of the apparatus according to FIGS. 1 and 2.

The geometry of the windings 12 and 13 is illustrated in perspective in FIG. 3, each of the winding heads 14, 15 and 16 being designed in the form described by Lyddane and Ruark in Rev. Sci. Instr. 10, 253 (1939). The winding head 14 in the embodiment of the invention according to FIG. 1 has N turns, whereas the winding head 15 has for example 9 N to 19 N turns, and the common winding head 16 therefore has 10 N to 20 N turns. The current I is equal and in the same direction in both windings 12 and 13 as indicated by arrows.

FIG. 4 illustrates a modification to the apparatus shown in FIG. 1, wherein only one cryostat 11 is used which is of U-shaped design. In this embodiment both windings 12 and 13 are connected in series by a bridge 17, so that only one current flows through both windings 12 and 13. FIGS. 5 and 6 show respectively an end view and a perspective winding diagram of this embodiment.

With wide tubes of the type used in the environment described the maximum measuring frequency is of the order of 20 MHz, so the required measuring field $H_o$ for protons in water is approximately 0.5 Tesla. To optimise the signal to noise ratio the polarisation field $H_p$ should be as high as possible. The windings 12 and 13 according to FIGS. 3 and 6 have N turns over the total length and, for example, over 80% of the length of the magnet they have 10 N to 20 N turns in the common winding region between winding heads 15 and 16, N of these turns extended at one end over the remaining 20% of the length of the magnet. In the region of N turns there is created a measuring field of approximately 0.5 Tesla, whereas in the region of the remaining length with the greater number of turns a polarisation field 4 of approximately from 5 to 10 Tesla is produced. All the turns have the "kinks" indicated by Lyddane and Ruark, as shown by the angles in the winding diagrams adjacent each winding head, so that at the beginning and end of each of the field regions there is a steep field gradient.

The magnet assembly of the embodiments described creates two fields their ratio given by the number of turns in the corresponding winding portions, therefore a ratio of $H_p/H_o$ of about 10, or possibly of up to about 20 may be attained, the latter value depending on the overall dimensions and on the nature of the superconducting material. Accordingly, the signal/noise ratio is improved by at least a factor of 10 in relation to a magnet with a uniform field, and at least by a factor of 5 in relation to an electromagnet with two fields.

A result of the kinks at the end of each winding set is to produce a steep field gradient in the longitudinal direction so that the nuclei are subject to the long relatively homogeneous polarisation field $H_p$ for a much greater period than that during which they are influenced by the smaller and much shorter leakage field at the ends of the windings. This applies also to the transition from polarisation field to measuring field, so that the latter is also relatively homogeneous in longitudinal (flow) direction. This contributes to increasing the accuracy of the NMR measurement in the flow.

The general description made with regard to FIGS. 1 to 6 also applies to FIGS. 7 to 17 which, however, differ in a number of aspects from FIGS. 1 to 6, as will become apparent in the ensuing description.

Figure 7:
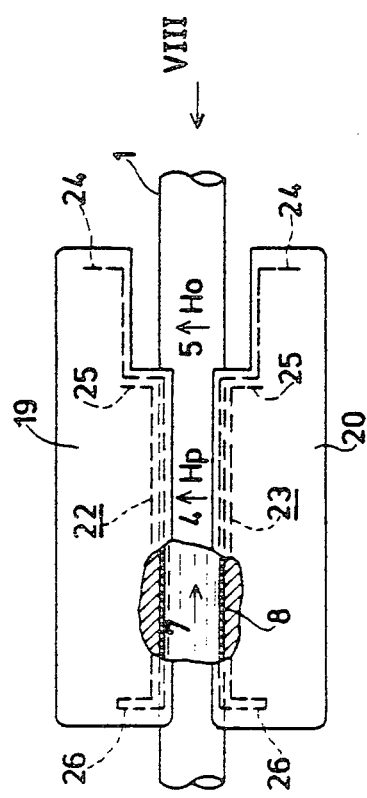
FIG. 7 shows a side view of another embodiment of an apparatus according to the invention.

In FIG. 7 one winding is designated 22, whereas the other winding is denoted by the reference numeral 23, the windings being accommodated in two separate cryostats 19 and 20. The flow direction of fluid 8 in the circulation tube 1 is indicated by arrow 7.

Figure 8:
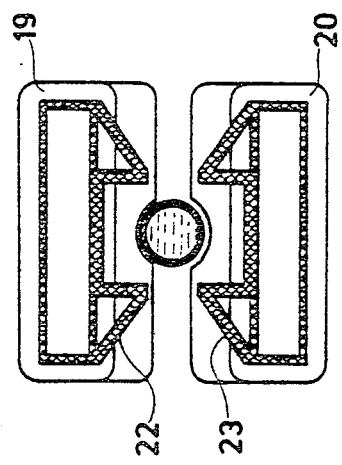
FIG. 8 shows an end view of the apparatus of FIG. 7 viewed in the direction of the arrow VIII in FIG. 7.
Figure 9:
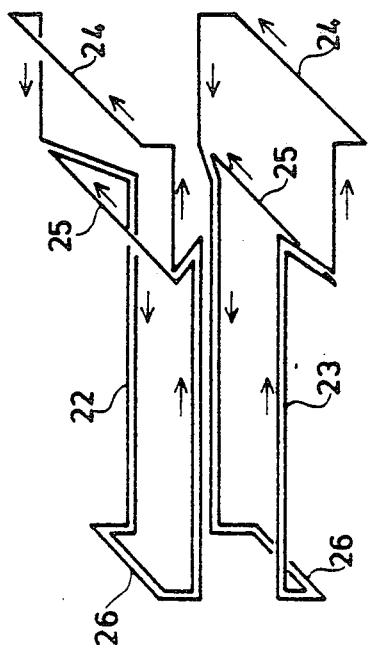
FIG. 9 shows a diagrammatic illustration in perspective of the windings of the apparatus according to FIGS. 7 and 8.

FIG. 8 shows an end view of the apparatus of FIG. 7, and FIG. 9 shows the corresponding winding diagram with a protracted winding head 24, a retracted winding head 25 and a common winding head 26. The numbers of turns between the common winding head 26 and the retracted winding head 25 which constitutes the polarisation field region and between the protracted winding head 24 and common winding head 26 which constitutes the measuring field are so determined that together with the current I, which is equal and in the same direction in both sets of windings and the geometry of the turns or windings, the desired field strengths are obtained i.e. $H_p$: 5 to 10 Tesla, $H_o$: 0.5 to 1 Tesla.

In FIG. 10 only one common cryostat is illustrated in contrast to the two cryostats 19 and 20 of the magnet of FIG. 7; FIG. 11 shows an end view thereof, 27 designates the bridge which connects the two windings.

The apparatus according to FIGS. 12 to 14 differs from that according to FIGS. 10 and 11 in that the polarisation field portion of the retracted winding head is extended perpendicularly to the circulation tube and in that no obliquely flowing currents are present, as in FIGS. 8 and 11. The result of this is that the apparatus according to FIGS. 12 to 14 has a more homogeneous measuring field than that according to FIGS. 7 to 9 or 10 and 11. Of course, it requires a larger cryostat.

Figure 16:
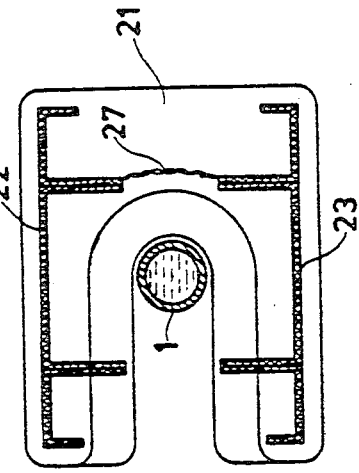
FIG. 16 shows an end view of the apparatus according to FIG. 15 in the direction of the arrow XVL in FIG. 15.
Figure 15:
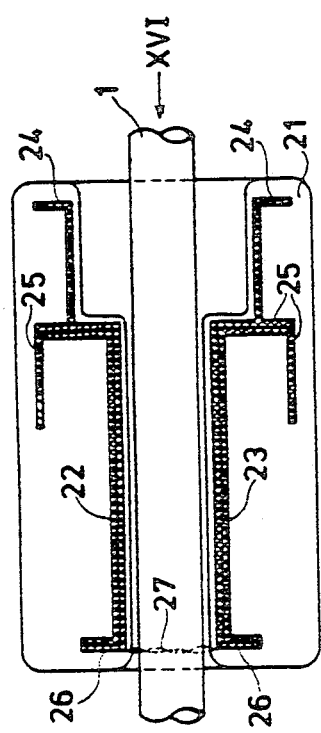
FIG. 15 shows a side view of another embodiment of the apparatus according to FIG. 12.
Figure 17:
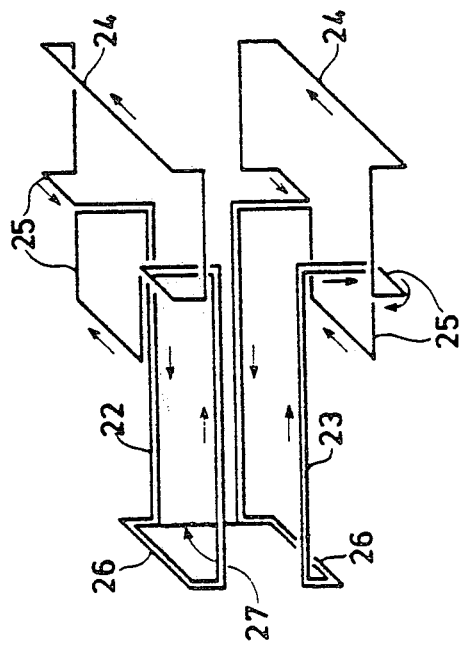
FIG. 17 shows a diagrammatic illustration in perspective of the windings of the apparatus according to FIGS. 15 and 16.

In the apparatus according to FIGS. 15 to 17, the extended polarisation-field portion of the recessed winding head is convoluted, in this way a smaller cryostat than the apparatus according to FIGS. 12 to 14 is necessary. The homogeneity of the measuring field is equally as good, but the homogeneity of the polarisation field is poorer.

The apparatus according to FIGS. 12 to 14 and FIGS. 15 to 17 are each shown with U-shaped cryostats. It would of course also be possible to illustrate the same apparatus with two half-shell cryostats in each case, similar to FIGS. 1 and 2 or FIGS. 7 and 8.

Preferably, the bridges 17 and 27 are of bifilar design in all cases so that, as far as possible, they do not create any interfering magnetic fields.

In all these embodiments of the apparatus, superconducting switches are required for charging, which can be heated, i.e. so-called "cryoswitches".

The difference between the embodiments of FIGS. 7 to 17 in comparison with the embodiments of FIGS. 1 to 6 lies firstly in that the coils are designed as "stepped coils", i.e. the windings 22 and 23 are offset stepwise in the region of the resonance field 5 in relation to the region of the polarisation field 4. The "stepped coil" of this also has a narrowed portion in the region of the polarisation field and a widened portion in the region of the measuring field, so that in this way the magnet is given a larger measuring-field space which, in turn, enables the high-frequency coils required for measurement to be accommodated more readily. Due to this geometry the medium flowing in the circulation tube is subject to a considerably more homogeneous measuring field, because the enlarged diameter of the $H_o$ region enables the circulation tube 1 which still has the same diameter to be situated only in the more uniform centre portion of the $H_o$ field. Improvement in homogeneity may enable, for example, a different high-frequency pulse programme to be chosen, and it is a general property of nuclear resonance to achieve greater measurement accuracy with increased homogeneity.

As evident from FIGS. 9, 14 and 17, the windings comprise a narrowed portion in the region of the polarisation field with the winding head 26 and a widened portion in the region of the measuring field with the winding head 24. The fields $H_p$ and $H_o$ are determined by the current I, the geometry and the number of turns. As evident from the drawing, it is possible to have a design in the form of two "half shells" with separate cryostats 19, 20 or a U-shaped cryostat 21 which fits over the circulation tube. An embodiment with two cryostats is advantageous in respect of simple installation and easy displacement, whereas a single U-shaped cryostat is advantageous with respect to taking the measurement of nuclear resonance, since the geometry is already defined and no adjustment of the two cryostats relative to one another is required; it is possible for separate cryostats which have been initially adjusted to go out of adjustment again in operation. A U-shaped cryostat is also preferable in respect of stability, since the two coils therein are secured mechanically in relation to one another and form an inherently more rigid structure.

In the case of cryomagnets it is generally possible to shorten the length of the polarisation field down to 20 cm, so that for a polarisation field $H_p$ with a magnetic induction of 5 Tesla the same polarisation effect is achieved as with an iron magnet of about 1 meter in length and with a polarisation field having a magnetic flux density of 1 Tesla. Admittedly, the shortening of the polarisation field does not make the signal/noise ratio any higher than for an iron magnet, however, it is possible to reduce the overall length, which is advantageous in the case of cramped space conditions such as in a reactor.

The magnet according to FIGS. 7 to 17 makes possible a polarisation field $H_p$ of approximately from 5 to 10 Tesla and a resonance field $H_o$ of approximately from 0.5 to 4 Tesla. An improvement in the signal/noise ratio may be attained by designs which enable a higher measuring field to be used. However, this is more of a high-frequency problem than a magnetic field problem.

The winding portions of the cryomagnets according to the embodiments of FIGS. 1 to 17 are designed so as to obtain the highest possible homogeneity of the magnetic fields, but they do not constitute genuine Lyddane and Ruark coils since they are designated in such a way that they simultaneously produce two magnetic fields $H_p$ and $H_o$. According to FIGS. 1 to 6, particularly FIG. 3, this is achieved in that the two winding portions have different winding heads and numbers of turns. In the embodiment of FIGS. 7 to 17, particularly FIG. 9, the winding portions are, moreover, of different diameter, whereby the circulation tube is positioned in the more homogeneous region of the measuring field $H_o$ and more space is available within the measuring field $H_o$ for the actual measuring apparatus which, for example, takes the form of one or more high-frequency coils and which have to be installed in pressure-resistant fashion in the circulation tube.

The Lyddane-Ruark coil is sufficiently homogeneous for the polarisation portion of all proposed embodiments of the apparatus according to the invention. In instances where its homogeneity is inadequate for the measuring-(resonance-)field portion, it is possible for this latter to have a different design.

I claim:

1. An apparatus for inducing nuclear spin resonance within a flowing medium contained within a conduit comprising a magnetic assembly including a pair of superconducting coils, the faces of which extend along opposite sides of a length of the conduit, a first region of the coils being constructed to produce a relatively greater magnetic flux density across a first section of said length of conduit, a second region of the coils being constructed to produce a relatively lesser magnetic flux density across a second section of said length of conduit, and a single cryostat containing said pair of superconducting coils.

2. An apparatus for inducing nuclear spin resonance within a flowing medium contained within a conduit comprising a magnetic assembly including a pair of superconducting coils, the faces of which extend along opposite sides of a length of the conduit, a first region of the coils being constructed to produce a relatively greater magnetic flux density across a first section of said length of conduit, a second region of the coils being constructed to produce a relatively lesser magnetic flux density across a second section of said length of conduit, and a pair of cryostats respectively containing said pair of superconducting coils.

3. An apparatus for inducing nuclear spin resonance within a flowing medium contained within a conduit comprising a magnetic assembly including a pair of superconducting coils, the faces of which extend along opposite sides of a length of the conduit, a first region of the coils being constructed to produce a relatively greater magnetic flux density across a first section of said length of conduit, a second region of the coils being constructed to produce a relatively lesser magnetic flux density across a second section of said length of conduit, said coils being wound such that a first number of turns are common to both first and second regions of the coil, and a second number of turns are provided in the first region only.

* * * * *